United States Patent [19]
Urabe et al.

[11] Patent Number: 6,031,483
[45] Date of Patent: Feb. 29, 2000

[54] FM RADAR SYSTEM

[75] Inventors: Masanobu Urabe; Satoru Komatsu, both of Wako, Japan

[73] Assignee: Honda Giken Kogyo Kabushiki Kaisha, Tokyo, Japan

[21] Appl. No.: 09/050,834

[22] Filed: Mar. 30, 1998

[30] Foreign Application Priority Data

Apr. 1, 1997 [JP] Japan .................................... 9-082984

[51] Int. Cl.[7] .................................................. G01S 13/34
[52] U.S. Cl. .............................. 342/70; 342/89; 342/128
[58] Field of Search ............................. 342/70, 71, 72, 342/89, 128

[56] References Cited

U.S. PATENT DOCUMENTS

| | | | |
|---|---|---|---|
| Re. 36,095 | 2/1999 | Urabe et al. | 342/133 |
| 3,811,774 | 5/1974 | Honetcutt et al. | 356/5.09 |
| 4,666,295 | 5/1987 | Duvall, III et al. | 356/5 |
| 5,369,409 | 11/1994 | Urabe et al. | 342/133 |
| 5,448,244 | 9/1995 | Komatsu et al. | 342/155 |
| 5,583,511 | 12/1996 | Hulderman | 342/175 |
| 5,731,781 | 3/1998 | Reed | 342/135 |

FOREIGN PATENT DOCUMENTS

4-109588  1/1992  Japan .
5-040169  2/1993  Japan .

*Primary Examiner*—John B. Sotomayor
*Attorney, Agent, or Firm*—Lyon & Lyon LLP

[57] ABSTRACT

A transmission channel selection controller intermittently energizes transmission amplifiers indicated by transmission channel information, based on a modulation signal supplied from a modulation signal generator, to modulate an FM signal. The modulated FM signal is radiated as a beam from transmission antennas. When the beam is reflected as an echo beam by an object, the echo beam is received by reception antennas which supply a reception signal to reception amplifiers. A first mixer mixes the FM signal with the amplified reception signal, producing a modulated beat signal which is a beat signal representing the distance up to the object and modulated by the frequency of the modulation signal. A second mixer mixes the modulated beat signal with the modulation signal thereby demodulating the modulated beat signal into the beat signal.

9 Claims, 9 Drawing Sheets

FIG. 6A TIME ZONE

FIG. 6B FM SGL

FIG. 6C TRANSM CHNL 1

FIG. 6D TRANSM CHNL 2

FIG. 6E TRANSM CHNL 3

FIG. 6F RECEP CHNL 1

FIG. 6G RECEP CHNL 2

FIG. 6H RECEP CHNL 3

FIG. 6I SGL PROCESSOR

FM RADAR SYSTEM

BACKGROUND OF THE INVENTION

1. Field of the Invention

The present invention relates to an FM radar system, and more particularly to an FM radar system having a circuit for both modulating a transmission signal or a reception signal and selecting a plurality of beam signals, for thereby increasing the S/N ratio of the reception signal and detecting the bearing of and the distance up to an object with high accuracy.

2. Description of the Prior Art

FM-CW radar systems for use on automobiles operate by frequency-modulating a high-frequency signal of 60 GHz or 77 GHz a millimeter-wave FM signal, transmitting the millimeter-wave FM signal forward of or around the automobile, receiving an echo beam reflected from an object, mixing the received echo signal with a local signal into a beat signal with a mixer, and detecting the position of the object from the frequency of the beat signal.

When the high-frequency signal is frequency-modulated, however, it is difficult to keep the FM signal at a constant level over a sweep frequency range. For this reason, when the high-frequency signal is frequency-modulated, it tends to be amplitude-modulated, and an AM component of the received signal is detected by the mixer.

Since the AM component is substantially the same as the frequency component of the FM signal and has frequencies much lower than those of the transmitted signal, when the AM component is mixed with the beat signal, its frequency is essentially the same as the frequency of the signal indicative of the object, resulting in a reduction in the accuracy with which to detect the position of the object.

The assignee of the present application has proposed an arrangement for avoiding low-frequency noise based on the principles of heterodyne detection as disclosed in Japanese laid-open patent publication No. 4-19588.

Specifically, Japanese laid-open patent publication No. 4-19588 discloses a millimeter-wave radar transmitter and receiver which multiplies the frequency of an FM signal generated by an FM CW source by four, transmits the multiplied-frequency FM signal, and mixes a received echo signal with a local signal which is generated by multiplying the frequency of the FM signal generated by the FM CW source by three, thereby generating a beat signal.

Japanese laid-open patent publication No. 5-40169 reveals an FM-CW radar system which has been proposed to solve the problem of a poor S/N ratio of a received echo signal due to the detection by a mixer of an AM component which has substantially the same frequencies as those of an FM signal and is added to the FM signal because of the gradient of an oscillated-frequency vs. output-voltage curve of a voltage-controlled frequency oscillator for an FM process with a very large frequency deflection. The disclosed FM-CW radar system has a frequency modulator connected between a radar transmitter and a transmission antenna, for modulating a signal, to be transmitted, with a second frequency which is at least twice the sum of or the difference between a Doppler frequency which is much lower than the frequency of the transmitted signal and generated due to a relative speed, and a beat frequency generated owing to a propagation delay time. The signal to be transmitted is modulated by the modulator, and the modulated signal is transmitted from the transmission antenna. A received echo signal reflected from an object is frequency-converted by a local oscillation signal with a first frequency converter, and then frequency-converted by the second frequency with a second frequency converter.

The assignee of the present application has also proposed a time-division multiplex FM radar system as disclosed in Japanese laid-open patent publication No. 7-5252. The proposed time-division multiplex FM radar system comprises a plurality of beam radiators and receivers for radiating overlapping beams of substantially identical radiation patterns and receiving reflected waves, an FM signal generator for generating an FM signal, and a transmitter having a transmission switching circuit for intermittently amplifying a portion of the FM signal at different times and distributing the intermittently amplified signals successively to the beam radiators. The proposed time-division multiplex FM radar system reduces its overall power consumption and inter-channel interference, and provides a high detection accuracy over a wide range regardless of the limited number of beam radiators used.

The simplified heterodyne system proposed in Japanese laid-open patent publication No. 5-40169 employs a simpler high-frequency circuit than the heterodyne system proposed in Japanese laid-open patent publication No. 4-19588, but nevertheless offers the same advantages.

However, the simplified heterodyne system is capable of detecting only the bearing of an object because it is not a multiple-beam system. It is important to solve this problem in the application of automobile radar systems because the automobile radar system on an automobile running in a lane of a multiple-lane road needs to have information about adjacent lanes.

The simplified heterodyne system proposed in Japanese laid-open patent publication No. 5-40169 may be combined with the time-division multiplex FM radar system as disclosed in Japanese laid-open patent publication No. 7-5252 to eliminate the problem of the poor S/N ratio of the received echo signal and also to be able to detect position of an object as well as its bearing.

However, if the simplified heterodyne system and the time-division multiplex FM radar system were simply combined with each other, then the combined assembly would require both the modulator for modulating a signal, to be transmitted, in order to improve the poor S/N ratio and the switching circuit for switching transmission beams. Consequently, the combined assembly would result in a complex radar system.

SUMMARY OF THE INVENTION

It is therefore an object of the present invention an FM to provide radar system which is capable of preventing a reduction of the S/N ratio of a received echo signal due to the detection of an AM component which has substantially the same frequencies as those of an FM signal and is added to the FM signal because of the gradient of an oscillated-frequency vs. output-voltage curve of a voltage-controlled frequency oscillator, and which is also capable of detecting the distance up to an object as well as the bearing thereof.

According to an embodiment of the present invention, there is provided an FM radar system comprising an FM signal generator for generating an FM signal over a sweep frequency range, a plurality of transmission channels for radiating the FM signal as a beam, a transmission channel selector for supplying the FM signal selectively to the transmission channels to select the transmission channels and modulating the FM signal, a reception circuit for receiving an echo beam reflected by an object and generating a reception signal based on the received echo beam, and a signal processor for generating a beat signal by mixing the FM signal and the reception signal and detecting the object based on the beat signal in a heterodyne detection mode.

Since the transmission channel selector supplies the FM signal selectively to the transmission channels to select the transmission channels and also modulates the FM signal, a high-frequency circuit arrangement of the FM radar system is relatively simple in structure.

The FM radar system further includes a modulation signal generator for generating a modulation signal to modulate the FM signal. The transmission channel selector modulates the FM signal with the modulation signal generated by the modulation signal generator and leaves the FM signal unmodulated when the modulation signal generated by the modulation signal generator is of a constant voltage or no modulation signal is generated by the modulation signal generator. The signal processor detects the object in a homodyne detection mode when the modulation signal generated by the modulation signal generator is of a constant voltage or no modulation signal is generated by the modulation signal generator.

According to an embodiment of the present invention, there is also provided an FM radar system comprising an FM signal generator for generating an FM signal over a sweep frequency range, a transmission circuit for radiating the FM signal as a beam, a plurality of reception channels for receiving an echo beam reflected by an object and generating a reception signal based on the received echo beam, a reception channel selector for selecting the reception channels and modulating the reception signal, and a signal processor for generating a beat signal by mixing the FM signal and the reception signal and detecting the object based on the beat signal in a heterodyne detection mode.

Since the reception channel selector selects the reception channels and also modulates the reception signal, a high-frequency circuit arrangement of the FM radar system is relatively simple in structure.

The FM radar system further includes a modulation signal generator for generating a modulation signal to modulate the FM signal. The reception channel selector modulates the reception signal with the modulation signal generated by the modulation signal generator and leaving the reception signal unmodulated when the modulation signal generated by the modulation signal generator is of a constant voltage or no modulation signal is generated by the modulation signal generator. The signal processor detects the object in a homodyne detection mode when the modulation signal generated by the modulation signal generator is of a constant voltage or no modulation signal is generated by the modulation signal generator.

If the FM radar system fails to detect an object in the heterodyne detection mode, then the FM radar system can operate in the homodyne detection mode to detect an object. Therefore, the FM radar system is highly reliable in operation. The FM radar system may further include a switch for switching between the heterodyne detection mode and the homodyne detection mode.

The signal processor may control the modulation signal generator to change a frequency of the modulation signal depending on a distance up to the detected object. Based on the detected distance up to the object, the transmission or reception signal may be modulated with a frequency appropriate for the detected distance to correct the detected distance for thereby increasing the accuracy of the detected distance.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Like or corresponding parts are denoted by like or corresponding reference characters throughout views.

Figure 1:
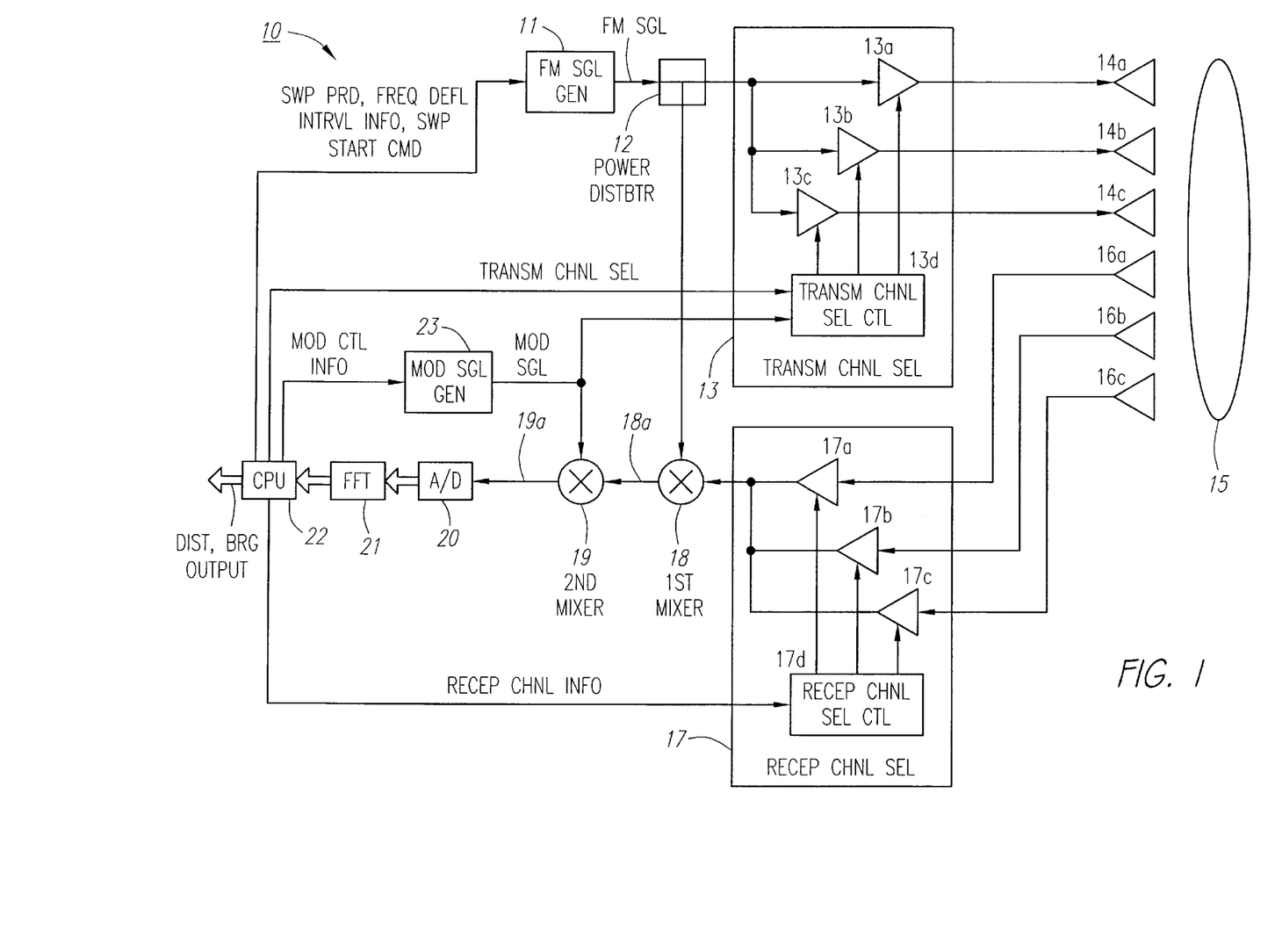
FIG. 1 is a block diagram of an FM radar system according to a first embodiment of the present invention.

FIG. 1 shows in block form an FM radar system 10 according to a first embodiment of the present invention.

As shown in FIG. 1, the FM radar system 10 comprises an FM signal generator 11, a power distributor 12, a transmission channel selector 13, a plurality of transmission antennas 14a–14c, a transmission/reception lens 15, a plurality of reception antennas 16a–16c, a reception channel selector 17, a first mixer 18, a second mixer 19, an A/D converter 20, a FFT (Fast-Fourier Transform) circuit 21, a CPU (Central Processing Unit) 22, and a modulation signal generator 23.

The FM signal generator 11 comprises a voltage-controlled oscillator for generating a millimeter-wave high-frequency signal and a sweep-frequency generator for changing the frequency of the high-frequency signal generated by the voltage-controlled oscillator.

In response to a sweep start signal from the CPU 22, the FM signal generator 11 generates an FM signal having a frequency deflection interval at a sweep period as designated by sweep period/frequency deflection interval information supplied from the CPU 22.

The FM signal generated by the FM signal generator 11 is supplied through the power distributor 12 to the transmission channel selector 13 and the first mixer 18.

The transmission channel selector 13 is in the form of an MMIC (Monolithic Microwave Integrated Circuit), and comprises a plurality of transmission amplifiers 13a–13c and a transmission channel selection controller 13d.

The transmission channel selection controller 13d energizes only one, at a time, of the transmission amplifiers 13a–13c which corresponds to a transmission channel designated by transmission channel information supplied from the CPU 22. Therefore, the transmission channel selection controller 13d can selectively energize the transmission amplifiers 13a–13c to select corresponding transmission channels.

When supplied with a modulation signal from the modulation signal generator 23, the transmission channel selection controller 13d switches on and off the transmission amplifier which corresponds to the designated transmission channel, based on the supplied modulation signal.

Because the transmission channel selection controller 13d thus controls the transmission and non-transmission of the FM signal from the power distributor 12 based on the modulation signal, the transmission channel selection controller 13d transmits the FM signal as it is turned on and off with the modulation signal, from the transmission channel selector 13.

Alternatively, the transmission channel selection controller 13d may switch on and off the transmission amplifiers 13a–13c by controlling the power supplies of these transmission amplifiers 13a–13c, or may switch on and off the transmission amplifiers 13a–13c by varying bias voltages applied to FETs (Field-Effect Transistors) or the like of the transmission amplifiers 13a–13c.

Each of the transmission amplifiers 13a–13c may be of a circuit arrangement having a predetermined amplification gain, or may comprise a simple switch circuit having no amplification gain or a predetermined attenuation level.

The transmission amplifiers 13a–13c supply respective amplified output signals respectively to the transmission antennas 14a–14c, from which they are radiated as electromagnetic beams. The electromagnetic beams radiated from the respective transmission antennas 14a–14c are oriented in predetermined directions, respectively, by the transmission/reception lens 15.

The transmission/reception lens 15 comprises a dielectric lens. However, the transmission/reception lens 15 may be replaced with a transmission/reception reflector or a secondary radiator such as a parabolic radiator.

The electromagnetic beams radiated from the transmission antennas 14a–14c through the transmission/reception lens 15 are oriented in predetermined directions, adjacent ones of which are slightly different from, but overlap, each other.

The reception antenna 16a has a reception directivity which is substantially the same as the transmission directivity of the transmission antenna 14a.

The reception antenna 16b has a reception directivity which is substantially the same as the transmission directivity of the transmission antenna 14b.

The reception antenna 16c has a reception directivity which is substantially the same as the transmission directivity of the transmission antenna 14c.

The reception channel selector 17 is in the form of an MMIC, and comprises a plurality of reception amplifiers 17a–17c and a reception channel selection controller 17d.

The reception antenna 16a receives an echo beam, reflected from an object, through the transmission/reception lens 15, and generates and supplies a reception signal to the reception amplifier 17a.

The reception antenna 16b receives an echo beam, reflected from an object, through the transmission/reception lens 15, and generates and supplies a reception signal to the reception amplifier 17b.

The reception antenna 16c receives an echo beam, reflected from an object, through the transmission/reception lens 15, and generates and supplies a reception signal to the reception amplifier 17c.

The reception channel selection controller 17d energizes only one, at a time, of the reception amplifiers 17a–17c which corresponds to a reception channel designated by reception channel information supplied from the CPU 22. Therefore, the reception channel selection controller 17d can selectively energize the reception amplifiers 17a–17c to select corresponding reception channels.

A reception signal which has been selected by the reception channel selector 17 is supplied to the first mixer 18. Instead of the single first mixer 18, a plurality of mixers may be connected to the respective reception amplifiers 17a–17c, and output signals from the mixers may be switched by a multiplexer.

The first mixer 18 mixes the reception signal which has been selected by the reception channel selector 17 with the FM signal supplied from the power distributor 12, thereby converting the frequency of the reception signal to produce a first frequency-converted output signal 18a, which is supplied to the second mixer 19.

The second mixer 19 mixes the first frequency-converted output signal 18a with the modulation signal from the modulation signal generator 23, thereby converting the frequency of the first frequency-converted output signal 18a to produce a second frequency-converted output signal 19a.

If the FM signal to be transmitted is not modulated by the transmission channel selector 13, then the modulation signal generator 23 produces a DC signal. In this case, the second mixer 19 outputs the first frequency-converted output signal 18a directly as the second frequency-converted output signal 19a.

The second frequency-converted output signal 19a from the second mixer 19 is supplied to the A/D converter 20.

The A/D converter 20 converts the second frequency-converted output signal 19a into a digital frequency-converted output signal, which is supplied to the FFT circuit 21.

The FFT circuit 21 analyzes the frequency spectrum of the supplied digital frequency-converted output signal and outputs frequency spectrum data of the analyzed digital frequency-converted output signal to the CPU 22.

The CPU 22 controls overall operation of the FM radar system 10.

The CPU 22 supplies the sweep start signal to the FM signal generator 11 to control the sweep timing of the FM signal.

The CPU 22 supplies the transmission channel information to the transmission channel selector 13 in synchronism with the sweep timing of the FM signal for thereby selectively switching the transmission channels, i.e., the transmission antennas 14a–14c and hence the electromagnetic beams radiated thereby.

The CPU 22 also supplies the reception channel information to the reception channel selector 17 in synchronism with the sweep timing of the FM signal for thereby selectively switching the reception channels, i.e., the reception antennas 17a–17c and hence the echo beams received thereby.

The CPU 22 supplies modulation control information to the modulation signal generator 23 to indicate whether the FM signal to be transmitted is to be modulated or not and also to indicate the modulation frequency with which to modulate the FM signal if the FM signal to be transmitted is to be modulated.

When the modulation frequency is indicated by the modulation control information, the modulation signal generator 23 generates a rectangular-wave signal (clock signal) having the indicated modulation frequency, and outputs the generated rectangular-wave signal (clock signal) as the modulation signal.

When the FM signal to be transmitted is not to be modulated as indicated by the modulation control information, the modulation signal generator 23 generates a DC signal such as an H-level DC signal, for example.

The CPU 22 determines the distance up to an object which has reflected radiated electromagnetic beams, based on the frequency spectrum data supplied from the FFT circuit 21, and also determines the bearing of the object based on information on the transmission antenna which has transmitted the electromagnetic beam to the object and the reception antenna which has received echo signal from the object.

The FM radar system 10 shown in FIG. 1 operates as follows:

The FM radar system 10 is operable in two detection modes, i.e., a homodyne detection mode in which the FM signal to be transmitted is not modulated, i.e., is not turned on and off, and a heterodyne detection mode in which the FM signal to be transmitted is modulated, i.e., is turned on and off.

In the homodyne detection mode, the CPU 22 supplies modulation control information indicating that the FM signal to be transmitted is not modulated, to the modulation signal generator 23. In response to the supplied modulation control information, the modulation signal generator 23 stops generating the modulation signal, but generates a H-level DC signal.

It is assumed that the transmission of a beam from the transmission antenna 14a in the direction determined by the transmission antenna 14a is referred to as the transmission in a channel 1, and similarly the transmission of beams from the transmission antennas 14b, 14c in the directions determined by the transmission antennas 14b, 14c is referred to as the transmission in channels 2, 3, respectively. It is also assumed that the reception of an echo beam with the reception antenna 16a in the direction determined by the reception antenna 16a is referred to as the reception in the channel 1, and similarly the reception of beams from the reception antennas 16b, 16c in the directions determined by the reception antennas 16b, 16c is referred to as the reception in the channels 2, 3, respectively.

When a beam is transmitted in the channel 1 and an echo beam is received in the channel 1, the FM radar system 10 can detect an object positioned in the direction of the channel 1, which is referred to as a first bearing.

Likewise, when a beam is transmitted in the channel 2 and an echo beam is received in the channel 2, the FM radar system 10 can detect an object positioned in the direction of the channel 2, which is referred to as a second bearing. When a beam is transmitted in the channel 3 and an echo beam is received in the channel 3, the FM radar system 10 can detect an object positioned in the direction of the channel 3, which is referred to as a third bearing.

The bearing of an object which may be positioned in either the direction of the channel 1 (first bearing) or the direction of the channel 2 (second bearing) can accurately be detected from the result of detection in the direction of the channel 1 and the result of detection in the direction of the channel 2.

When a beam is transmitted in the channel 1 and an echo beam is received in the channel 2, it is possible to detect a bearing based on a hypothetical beam intermediate between the direction of the channel 1 (first bearing) and the direction of the channel 2 (second bearing).

Operation of the FM radar system 10 in the homodyne detection mode upon the transmission in the channel 1 and the reception in the channel 1 will be described below.

In the homodyne detection mode, the FM radar system 10 operates in the same manner as the conventional FM-CW radar system.

The CPU 22 designates the transmission in the channel 1 with the transmission channel information which the CPU 22 supplies to the transmission channel selection controller 13d and also designates the reception in the channel 1 with the reception channel information which the CPU 22 supplies to the reception channel selection controller 17d.

Based on the supplied transmission channel information indicative of the transmission in the channel 1, the transmission channel selection controller 13d energizes the transmission amplifier 13a.

Since no modulation signal is supplied from the modulation signal generator 23 to the transmission channel selection controller 13d, the transmission amplifier 13a remains continuously energized.

The FM signal which has been generated by the FM signal generator 11 and whose frequency is varying with time in a predetermined frequency sweep period is now amplified by the transmission amplifier 13a, and then radiated from the transmission antenna 14a through the transmission/reception lens 15 in the direction of the channel 1 (first bearing).

Based on the supplied reception channel information indicative of the reception in the channel 1, the reception channel selection controller 17d energizes the reception amplifier 17a.

An echo beam reflected from an object is received by the reception antenna 17a, which generates a reception signal that is amplified by the reception amplifier 17a. The amplified signal is supplied from the reception amplifier 17a to the first mixer 18.

The first mixer 18 mixes the FM signal from the power distributor 12 with the reception signal in the channel 1 into a first frequency-converted output signal 18a.

Specifically, the first mixer 18 generates the first frequency-converted output signal 18a as a beat signal whose frequency represents the difference between the frequency of the FM signal and the frequency of the reception signal in the channel 1.

The first frequency-converted output signal 18a is supplied to the second mixer 19. Since no modulation signal is supplied to the second mixer 19 in the homodyne detection mode, the second mixer 19 supplies the first frequency-converted output signal 18a to the A/D converter 20.

The A/D converter 20 converts the first frequency-converted output signal 18a into a digital frequency-converted output signal, which is supplied to the FFT circuit 21.

The FFT circuit 21 effects a fast-Fourier transform on a digital frequency-converted output signal supplied from the A/D converter 20, and outputs frequency spectrum data of the beat signal whose frequency represents the difference between the frequency of the FM signal and the frequency of the reception signal in the channel 1.

The CPU 22 determines the distance up to the object based on the frequency spectrum data of the beat signal. The CPU 22 also determines the bearing of the object based on the information of the channel 1 which is used in the transmission and reception of the beam.

It is difficult to keep the FM signal generated by the FM signal generator 11 at a constant level throughout the entire sweep frequency range. Therefore, the level of the FM signal varies as its frequency varies in the sweep frequency range.

As a result, the FM signal contains an amplitude-modulated component of the frequencies corresponding to the sweep frequency period. The amplitude-modulated component is carried by the echo beam, and detected by the first mixer 18.

When the frequency of the beat signal detected depending on the distance up to the object and the frequencies corresponding to the sweep frequency period are close to each other, the frequency spectrum (signal component) of the beat signal representative of the distance up to the object and an unwanted frequency spectrum (noise component) produced due to the level variation of the FM signal cannot be distinguished from each other, i.e., a sufficient S/N ratio between the signal and noise components cannot be maintained, with the result that the distance up to the object cannot accurately be detected.

However, the S/N ratio can be improved under such a condition when the FM radar system 10 operates in the heterodyne detection mode.

Operation of the FM radar system 10 in the heterodyne detection mode will now be described below.

The CPU 22 supplies modulation control information indicative of a modulation frequency sufficiently higher than the frequency of the beat signal to the modulation signal generator 23, which generates a modulation signal that is supplied to the transmission channel selection controller 13d.

The transmission channel selection controller 13d turns on and off the transmission amplifier 13a in the designated channel 1 based on the modulation signal. The transmission amplifier 13a now outputs an FM signal modulated with the modulation frequency to the transmission antenna 14a, which then radiates a modulated beam.

The reception antenna 16a receives an echo beam from an object, and outputs a reception signal to the reception amplifier 17a. The first mixer 18 mixes the FM signal and the reception signal from the reception amplifier 17a with each other, and outputs a first frequency-converted output signal 18a. The first frequency-converted output signal 18a contains a modulated beat signal which is the beat signal representing the distance up to the object and modulated by the modulation frequency which is higher than the frequency of the beat signal, i.e., a signal representative of a mixture of the beat signal and the modulation signal, or stated otherwise, the beat signal modulated by the modulation signal.

The second mixer 19 mixes the modulated beat signal and the modulation signal with each other, thereby demodulating the modulated beat signal into the beat signal.

In this manner, the beat signal indicative of the distance up to the object can effectively be extracted without being adversely affected by the noise component contained in the FM signal due to its level variation.

In the heterodyne detection mode, even when the frequency of the beat signal detected depending on the distance up to the object and the frequencies corresponding to the frequency sweep period are close to each other, the beat signal indicative of the distance up to the object can be detected with an improved S/N ratio.

The transmission channel selection controller 13d is effective in simultaneously selecting transmission channels and modulating transmission signals. Therefore, a high-frequency circuit arrangement of the FM radar system 10 is relatively simple in structure. The FM radar system 10 can increase the S/N ratio of reception signals and can scan a desired area with radiated and echo beams.

Figure 2:
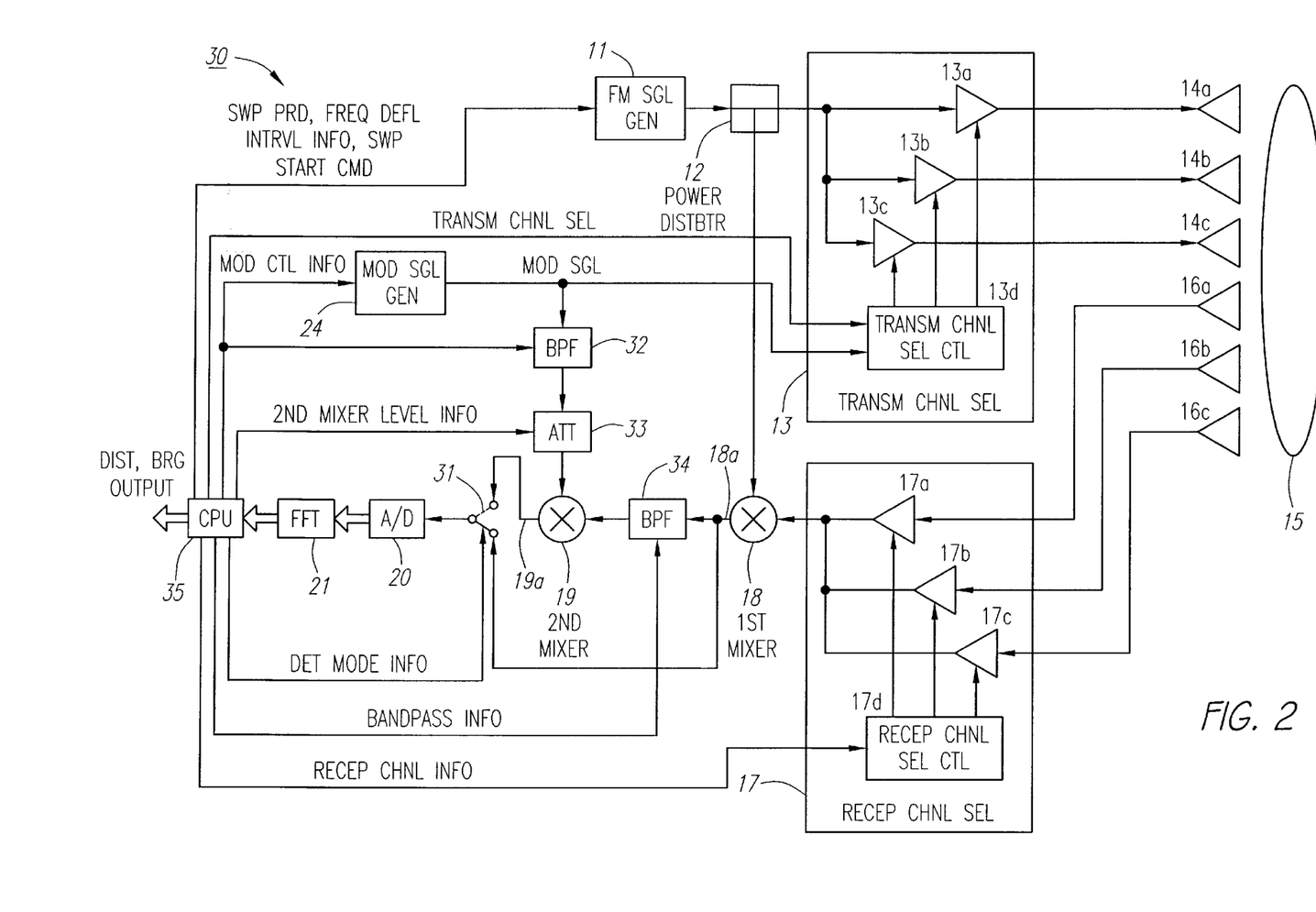
FIG. 2 is a block diagram of an FM radar system according to a second embodiment of the present invention.

FIG. 2 shows in block form an FM radar system 30 according to a second embodiment of the present invention.

As shown in FIG. 2, the FM radar system 30 comprises the same circuit components as those of the FM radar system 10 shown in FIG. 1, and additionally has a switch 31 for selectively supplying a signal in the homodyne detection mode and a signal in the heterodyne detection mode to the A/D converter 20, a variable bandpass filter (BPF) 32 for extracting a fundamental frequency component from a rectangular-wave modulation signal generated by a modulation signal generator 24, a variable attenuator (ATT) 33 for adjusting the level of the fundamental frequency component from the variable bandpass filter 32 and supplying the level-adjusted fundamental frequency component to the second mixer 19, and another variable bandpass filter (BPF) 34 connected between the first and second mixers 18, 19 for extracting a fundamental frequency component and removing signals in unwanted frequency bands from the first frequency-converted output signal 18a from the first mixer 18.

For detecting the distance up to and the bearing of an object in the homodyne detection mode, a CPU 35 supplies detection mode information indicative of the homodyne detection mode to the switch 31 to move a movable contact of the switch 31 to the solid-line position for thereby supplying the first frequency-converted output signal 18a from the first mixer 18 to the A/D converter 20.

For detecting the distance up to and the bearing of an object in the heterodyne detection mode, the CPU 35 supplies detection mode information indicative of the heterodyne detection mode to the switch 31 to move the movable contact of the switch 31 to the dotted-line position for thereby supplying the second frequency-converted output signal 19a from the second mixer 19 to the A/D converter 20.

In the heterodyne detection mode, the CPU 35 supplies modulation control information indicative of a modulation frequency to the modulation signal generator 24 to enable the modulation signal generator 24 to generate a modulation signal having the indicated modulation frequency. The modulation control information is also supplied to the variable bandpass filter 32 to set the central frequency thereof to the indicated modulation frequency.

Therefore, even when the modulation frequency is changed, the variable bandpass filter 32 is able to extract the fundamental frequency component of the modulation signal.

If the modulation frequency is fixed, then it is not necessary for the bandpass filter 32 to be of the variable bandpass type, and also for the CPU 35 to supply modulation control information indicative of a modulation frequency to the bandpass filter 32.

A signal indicative of the fundamental frequency component extracted by the bandpass filter 32 is supplied from the bandpass filter 32 through the attenuator 33 to the second mixer 19.

The CPU 35 supplies second mixer level information to the attenuator 33 to adjust the level of the fundamental frequency component that is supplied to the second mixer 19.

If the level of the fundamental frequency component supplied to the second mixer 19 is not to be adjusted, then the attenuator 33 is not required to be of the variable type, but may be of the fixed type or may even be dispensed with.

The CPU 35 supplies bandpass information corresponding to the modulation frequency to the bandpass filter 34 to control the bandpass of the bandpass filter 34.

The CPU 35 designates a modulation frequency that is sufficiently higher than the frequency of the beat signal, and also establishes low frequencies to be blocked by the bandpass filter 34 in order to remove frequencies corresponding to the sweep frequency range of the FM signal.

The CPU 35 also establishes high frequencies to be blocked by the bandpass filter 34 in order to remove high frequencies which are not to be detected, based on the sweep frequency range of the FM signal, the frequency deflection, and the maximum distance to be detected.

The CPU 35 may alternatively establish a bandpass width of the bandpass filter 34 based on the modulation frequency such that the modulation frequency will be the central frequency of the bandpass width of the bandpass filter 34.

The FM radar system 30 shown in FIG. 2 operates as follows:

In the heterodyne detection mode, the CPU 35 supplies modulation control information indicative of a modulation frequency sufficiently higher than the frequency of the beat signal to the modulation signal generator 24, which generates a modulation signal that is supplied to the transmission channel selection controller 13d.

The transmission channel selection controller 13d turns on and off the transmission amplifier 13a in the designated channel 1 based on the modulation signal. The transmission amplifier 13a now outputs an FM signal modulated with the modulation frequency to the transmission antenna 14a, which then radiates a modulated beam.

The reception antenna 16a receives an echo beam from an object, and outputs a reception signal to the reception amplifier 17a. The first mixer 18 mixes the FM signal and the reception signal from the reception amplifier 17a with each other, and outputs a first frequency-converted output signal 18a. The first frequency-converted output signal 18a contains a modulated beat signal which is the beat signal representing the distance up to the object and modulated by the modulation frequency which is higher than the frequency of the beat signal, i.e., a signal representative of a mixture of the beat signal and the modulation signal, or stated otherwise, the beat signal modulated by the modulation signal.

The bandpass filter 34 extracts the modulated beat signal from the first frequency-converted output signal 18a.

The second mixer 19 mixes the modulated beat signal extracted by the bandpass filter 34 with the fundamental frequency signal supplied through the bandpass filter 32 and the attenuator 33, thereby demodulating the modulated beat signal into the beat signal.

In the heterodyne detection mode, after frequencies corresponding to the sweep frequency range of the FM signal and signals in unwanted frequency bands are removed, the modulated beat signal is demodulated into the beat signal by the second mixer 19. Therefore, the reception signal indicative of the echo beam from the object can be detected without a reduction in the S/N ratio.

FIGS. 3A through 3I illustrate an example of the heterodyne detection mode of the FM radar systems 10, 30 shown in FIGS. 1 and 2 when an FM signal, to be transmitted, is modulated in the transmission side of the FM radar systems 10, 30.

In the example shown in FIGS. 3A through 3I, an object located at a long distance is detected in the heterodyne detection mode in view of a reduction in the S/N ratio due to the fact that the frequency of the beat signal and the frequency of variations in the level of the FM signal in the frequency sweep period thereof.

If the S/N ratio is lowered in detecting an object located at a short distance, then the object is detected in the heterodyne detection mode in a manner different from the example shown in FIGS. 3A through 3I.

Figure 3A:
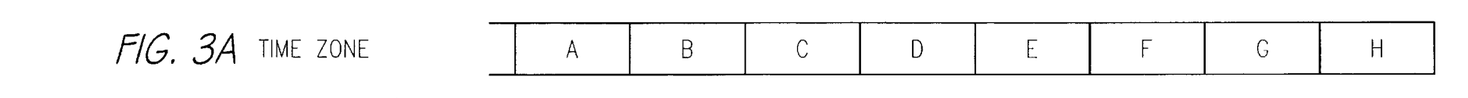
FIGS. 3A through 3I are diagrams illustrative of an example of a heterodyne detection mode of the FM radar systems shown in FIGS. 1 and 2 when an FM signal, to be transmitted, is modulated in a transmission side of the FM radar systems.
Figure 3B:
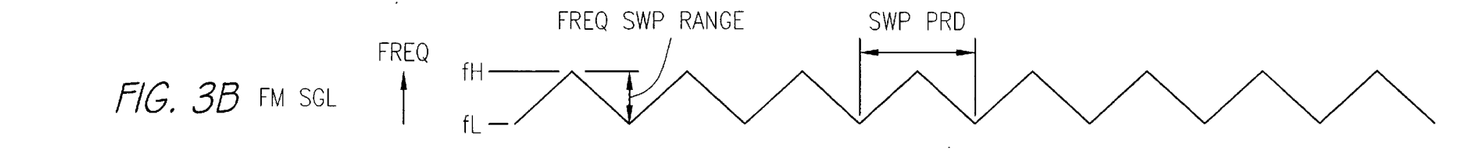

The process shown in FIGS. 3A through 3I is divided into a succession of time zones A–H, which are sequentially followed as the frequency sweep period cycles as shown in FIG. 3B.

Figures 3C, 3D:
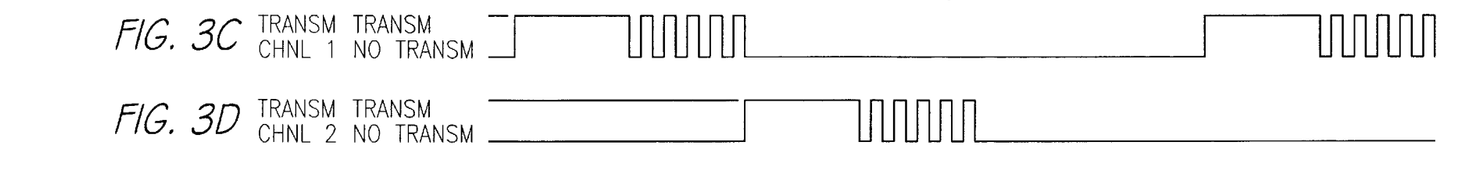
Figure 3E:
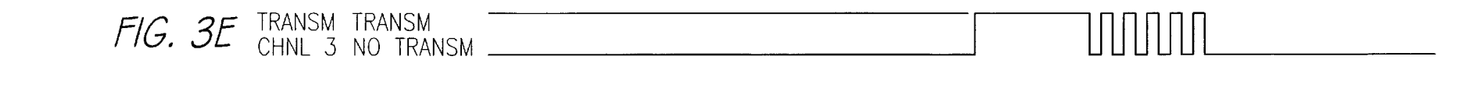
Figure 3F:
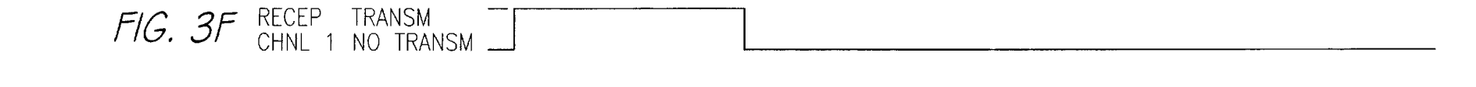

In the time zone A, an FM signal is continuously transmitted in the transmission channel 1 as shown in FIG. 3C, and an echo signal is received in the reception channel 1 as shown in FIG. 3F. The echo signal is processed, by a signal processor including the A/D converter 20, the FFT circuit 21, and the CPU 22, 35, to detect an object at a short distance in the direction of the radiated and reflected beam in the channel 1.

In the time zone B, an FM signal is intermittently transmitted in the transmission channel 2 as shown in FIG. 3C, and an echo signal is received in the reception channel 1 as shown in FIG. 3F. The echo signal is processed to detect an object at a long distance in the direction of the radiated and reflected beam in the channel 1.

Figure 3G:
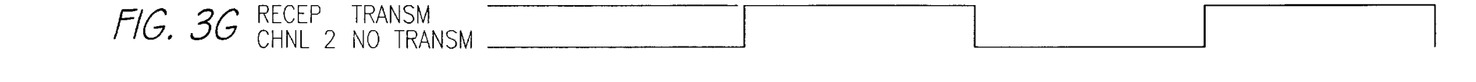

In the time zone C, an FM signal is continuously transmitted in the transmission channel 2 as shown in FIG. 3D, and an echo signal is received in the reception channel 2 as shown in FIG. 3G. The echo signal is processed to detect an object at a short distance in the direction of the radiated and reflected beam in the channel 2.

In the time zone D, an FM signal is intermittently transmitted in the transmission channel 2 as shown in FIG. 3D, and an echo signal is received in the reception channel 2 as shown in FIG. 3G. The echo signal is processed to detect an object at a long distance in the direction of the radiated and reflected beam in the channel 2.

Figure 3H:
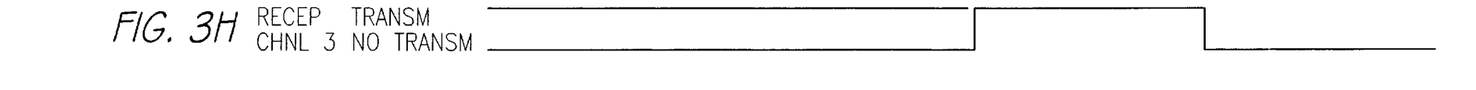
Figure 3I:
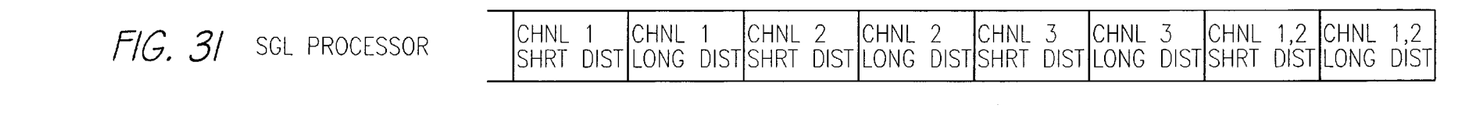

In the time zone E, an FM signal is continuously transmitted in the transmission channel 3 as shown in FIG. 3E, and an echo signal is received in the reception channel 3 as shown in FIG. 3H. The echo signal is processed to detect an object at a short distance in the direction of the radiated and reflected beam in the channel 3.

In the time zone F, an FM signal is intermittently transmitted in the transmission channel 3 as shown in FIG. 3E, and an echo signal is received in the reception channel 3 as shown in FIG. 3H. The echo signal is processed to detect an object at a long distance in the direction of the radiated and reflected beam in the channel 3.

If an object is detected in the channel 1 or channel 2, then an FM signal is transmitted in the channel 1 and an echo signal is received in the channel 2 or an FM signal is transmitted in the channel 2 and an echo signal is received in the channel 1, as indicated by the time zones G, H, in order to detect an object in a hypothetical beam direction intermediate between the direction of the beam in the channel 1 and the direction of the beam in the channel 2. In this manner, the bearing of the detected object can be detected accurately on the basis of the detected results (distance, bearing, and reception signal intensity) in the time zone A, B, C, or D and the detected results in the time zone G or H.

Figure 4:
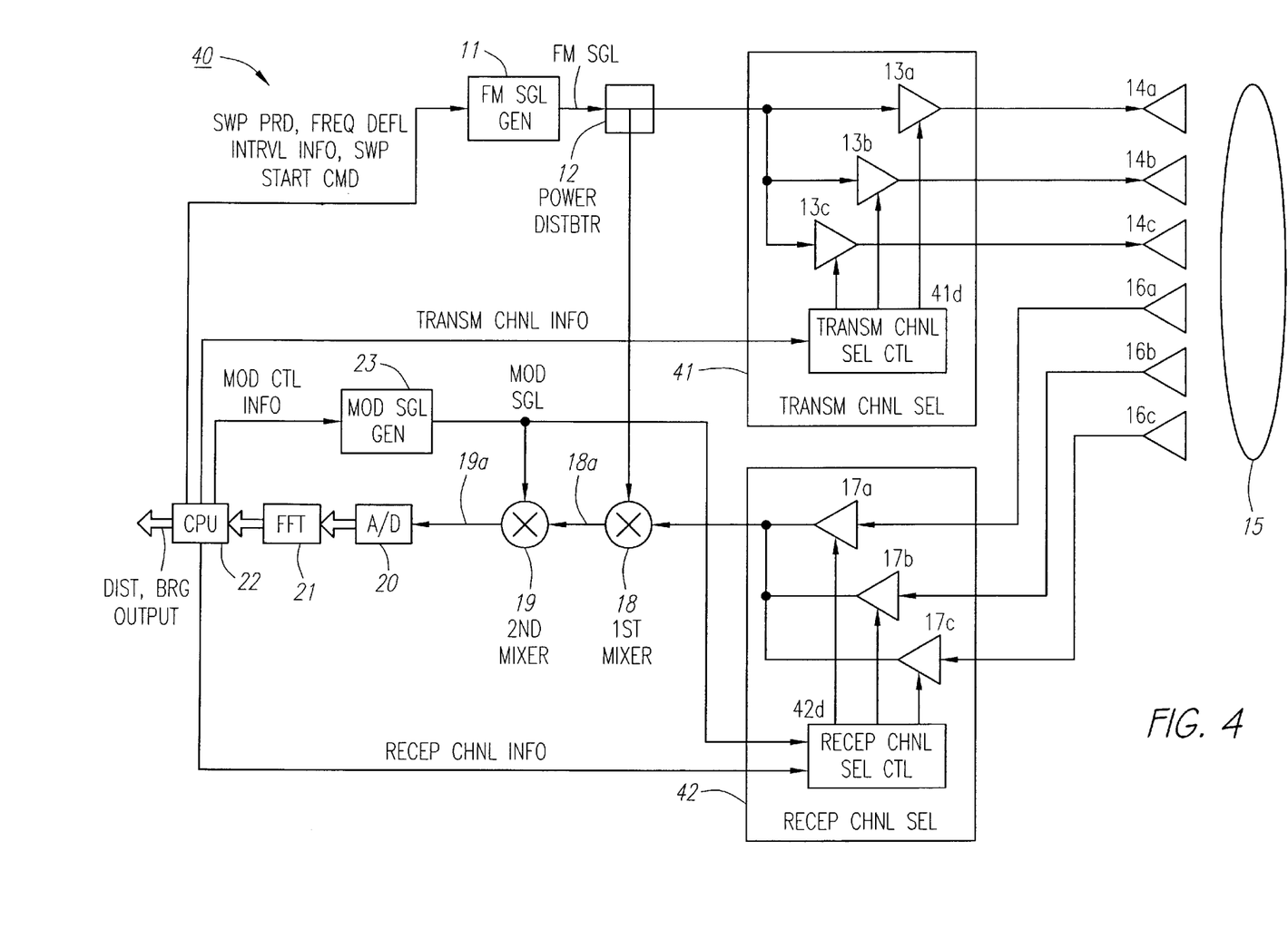
FIG. 4 is a block diagram of an FM radar system according to a third embodiment of the present invention.

FIG. 4 shows in block form an FM radar system 40 according to a third embodiment of the present invention.

The FM radar system 40 shown in FIG. 4 modulates a reception signal in its reception side for improving an S/N ratio of the reception signal.

The FM radar system 40 shown in FIG. 4 differs from the FM radar system 10 shown in FIG. 1 with respect to a transmission channel selector 41 and a reception channel selector 42.

The transmission channel selector 41 has a transmission channel selection controller 41d for selectively energizing a plurality of transmission amplifiers 13a–13c according to transmission channel information supplied from the CPU 22.

The reception channel selector 42 has a reception channel selection controller 42d for selectively energizing a plurality of reception amplifiers 17a–17c according to reception channel information supplied from the CPU 22.

The reception channel selection controller 42d receives the modulation signal from the modulation signal generator 23. While being supplied with the modulation signal from the modulation signal generator 23, the reception channel selection controller 42d turns on and off the reception amplifier corresponding to a designated channel indicated by the reception channel information, based on the modulation signal.

Since the reception amplifier corresponding to the designated channel is turned on and off, i.e., energized intermittently, on the basis of the modulation signal, the reception channel selector 42 produces a reception signal that is turned on and off on the basis of the modulation signal.

The reception channel selection controller 42d is effective in simultaneously selecting reception channels and modulating reception signals. Therefore, a high-frequency circuit arrangement of the FM radar system 40 is relatively simple in structure. The FM radar system 40 can increase the S/N ratio of reception signals and can scan a desired area with radiated and echo beams.

Figure 5:
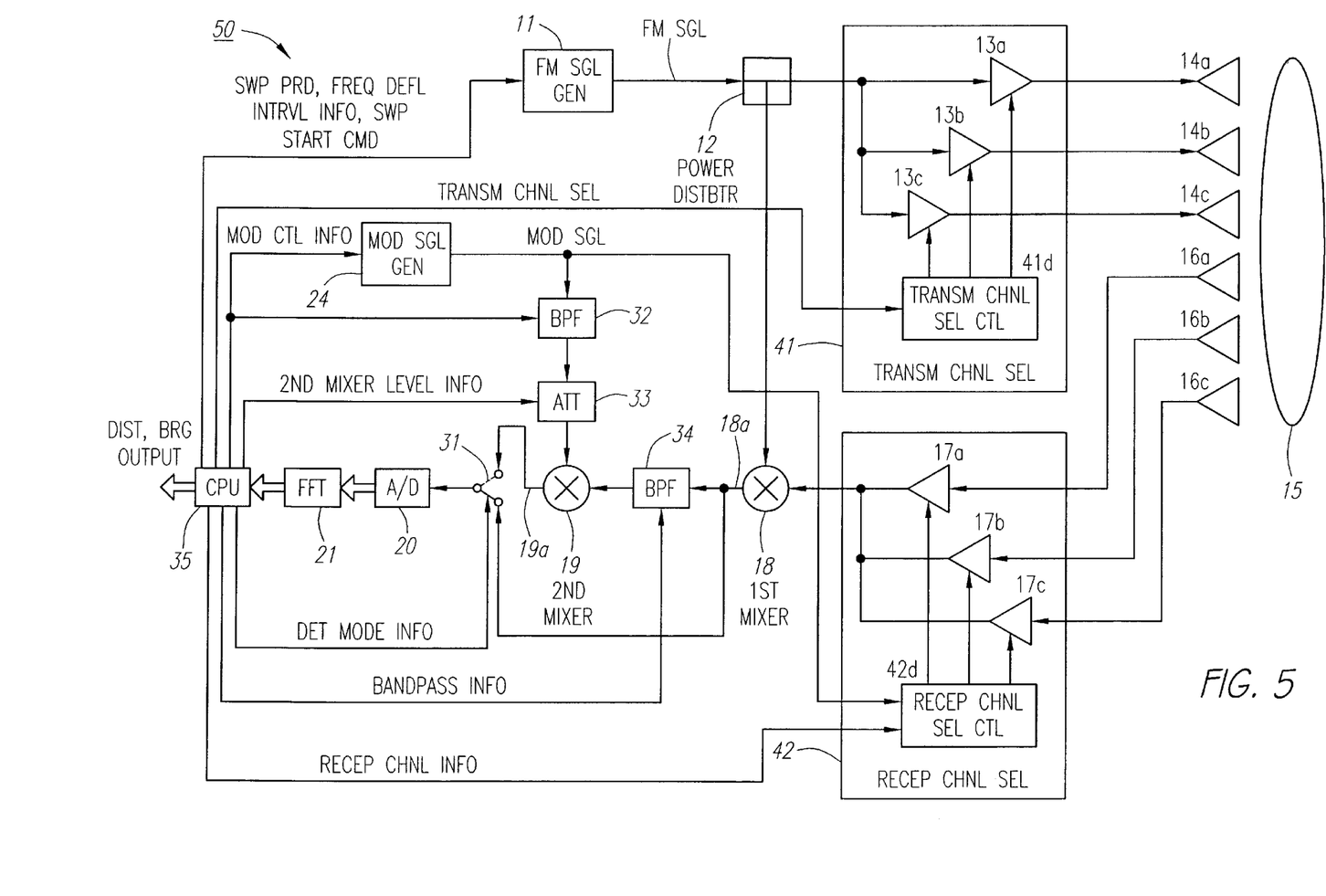
FIG. 5 is a block diagram of an FM radar system according to a fourth embodiment of the present invention.

FIG. 5 shows in block form an FM radar system 50 according to a fourth embodiment of the present invention.

The FM radar system 50 shown in FIG. 5 is similar to the FM radar system 30 shown in FIG. 2 except that the FM radar system 50 modulates a reception signal in its reception side for improving an S/N ratio of the reception signal.

The FM radar systems 40, 50 shown in FIGS. 4 and 5 can produce the same reception signal as the FM radar systems 10, 30 which modulate the FM signal in the transmission side, for thereby improving the S/N ratio of the reception signal to detect the distance up to an object with high accuracy.

FIGS. 6A through 6I illustrate an example of the heterodyne detection mode of the FM radar systems 40, 50 shown in FIGS. 4 and 5 when a reception signal is modulated in the reception side of the FM radar systems 40, 50.

In the example shown in FIGS. 6A through 6I, an object located at a long distance is detected in the heterodyne detection mode in view of a reduction in the S/N ratio due to the fact that the frequency of the beat signal and the frequency of variations in the level of the FM signal in the frequency sweep period thereof.

If the S/N ratio is lowered in detecting an object located at a short distance, then the object is detected in the heterodyne detection mode in a manner different from the example shown in FIGS. 6A through 6I.

Figure 6A:
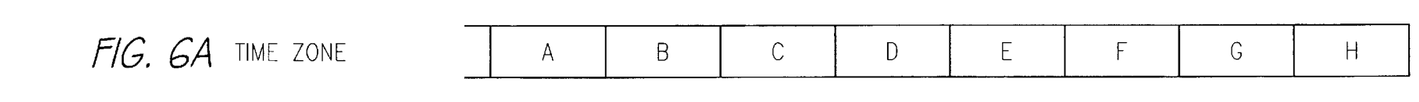
FIGS. 6A through 6I are diagrams illustrative of an example of a heterodyne detection mode of the FM radar systems shown in FIGS. 4 and 5 when a received echo signal is modulated in a reception side of the FM radar systems.
Figure 6B:
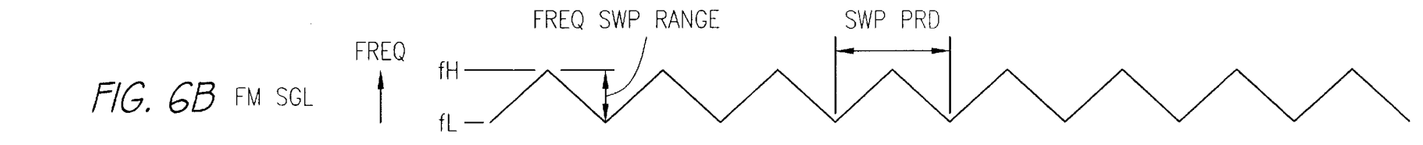

The process shown in FIGS. 6A through 6I is divided into a succession of time zones A–H, which are sequentially followed as the frequency sweep period cycles as shown in FIG. 6B.

Figure 6C:
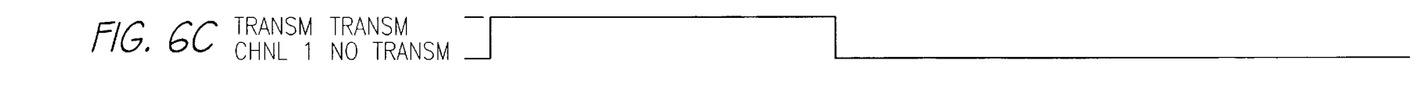
Figure 6D:
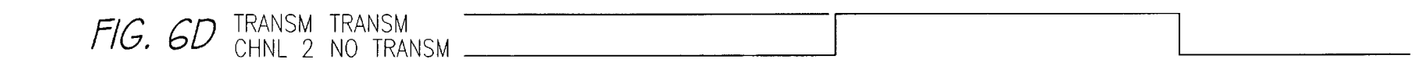
Figure 6E:
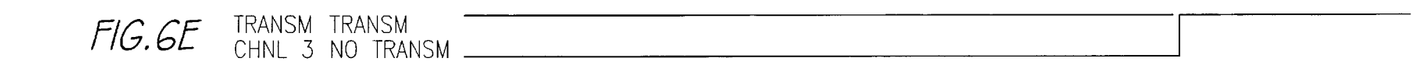
Figure 6F:
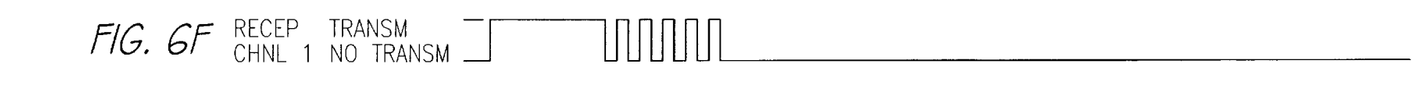

In the time zone A, an FM signal is transmitted in the transmission channel 1 as shown in FIG. 6C, and an echo signal is continuously received in the reception channel 1 as shown in FIG. 6F. The echo signal is processed, by a signal processor including the A/D converter 20, the FFT circuit 21, and the CPU 22, 35, to detect an object at a short distance in the direction of the radiated and reflected beam in the channel 1.

In the time zone B, an FM signal is transmitted in the transmission channel 1 as shown in FIG. 6C, and an echo signal is intermittently received in the reception channel 1 as shown in FIG. 6F. The echo signal is processed to detect an object at a long distance in the direction of the radiated and reflected beam in the channel 1.

Figure 6G:
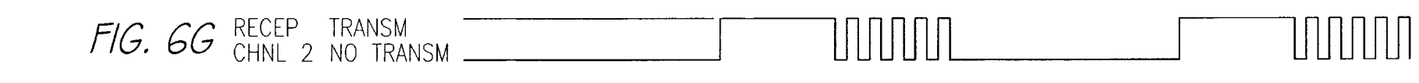

In the time zone C, an FM signal is transmitted in the transmission channel 1 as shown in FIG. 6C, and an echo signal is continuously received in the reception channel 2 as shown in FIG. 6G. The echo signal is processed to detect an object at a short distance in the direction of the reflected beam in the channel 2.

In the time zone D, an FM signal is transmitted in the transmission channel 2 as shown in FIG. 6D, and an echo signal is intermittently received in the reception channel 2 as shown in FIG. 6G. The echo signal is processed to detect an object at a long distance in the direction of the radiated and reflected beam in the channel 2.

Figure 6H:
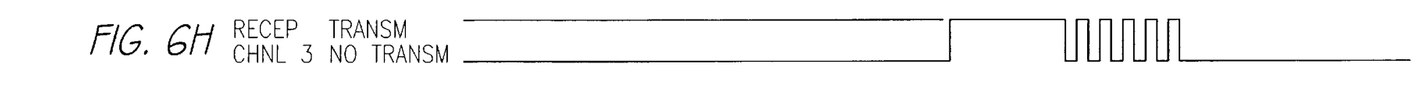
Figure 6I:
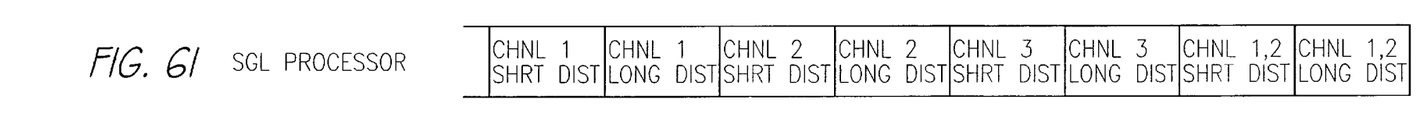
Figures 7A, 7B, 7C:
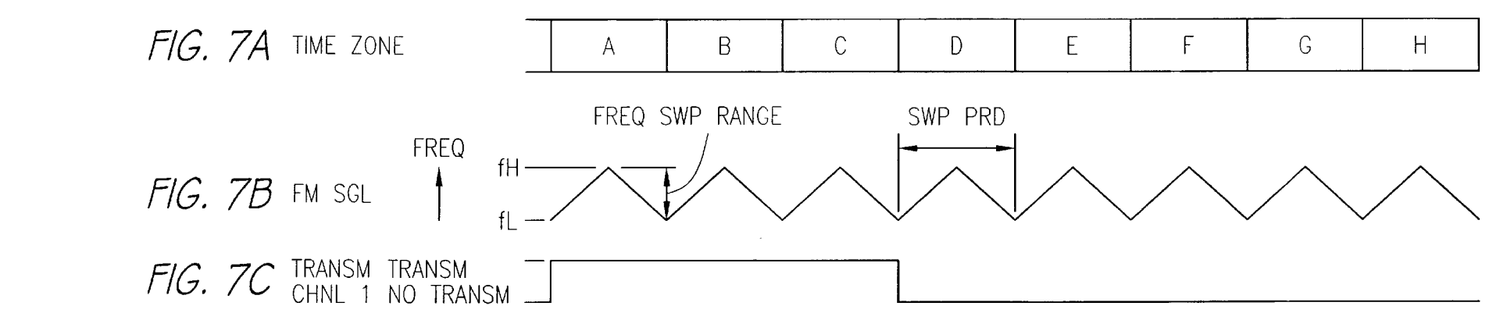
FIG. 7A through 7I are diagrams illustrative of another example of the heterodyne detection mode of the FM radar systems shown in FIGS. 4 and 5 when a received echo signal is modulated in a reception side of the FM radar systems.
Figure 7D:
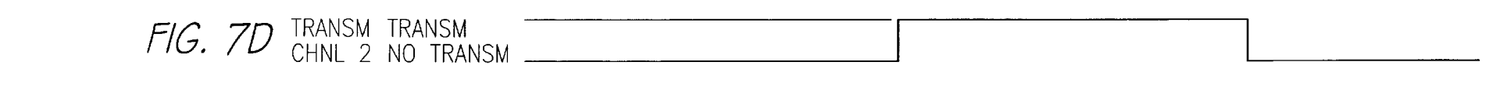
Figure 7E:
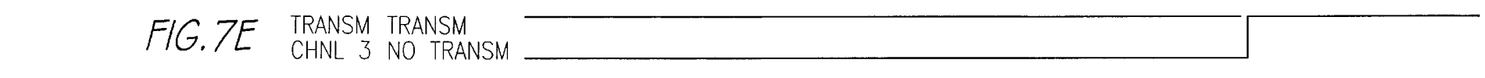
Figure 7F:
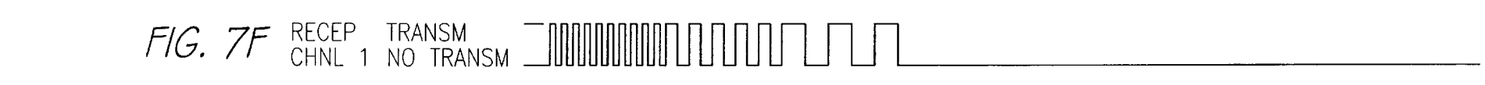
Figure 7G:
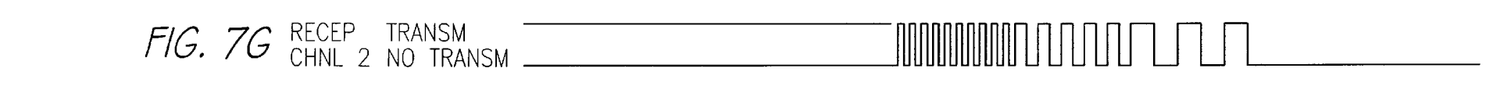
Figure 7H:
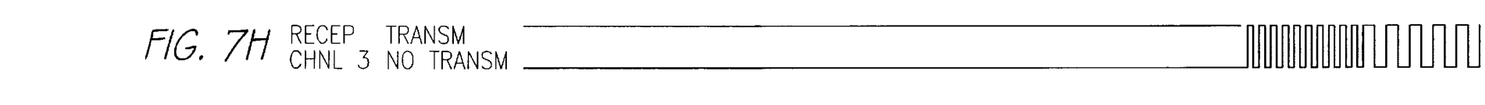
Figure 7I:
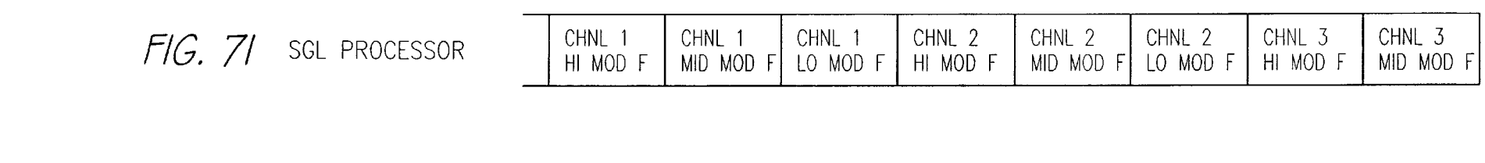

In the time zone E, an FM signal is transmitted in the transmission channel 2 as shown in FIG. 6D, and an echo signal is continuously received in the reception channel 3 as shown in FIG. 6H. The echo signal is processed to detect an object at a short distance in the direction of the reflected beam in the channel 3.

In the time zone F, an FM signal is transmitted in the transmission channel 2 as shown in FIG. 6D, and an echo signal is intermittently received in the reception channel 3 as shown in FIG. 6H. The echo signal is processed to detect an object at a long distance in the direction of the reflected beam in the channel 3.

If an object is detected in the channel 1 or channel 2, then an FM signal is transmitted in the channel 1 and an echo signal is received in the channel 2 or an FM signal is transmitted in the channel 2 and an echo signal is received in the channel 1, as indicated by the time zones G, H, in order to detect an object in a hypothetical beam direction intermediate between the direction of the beam in the channel 1 and the direction of the beam in the channel 2. In this manner, the bearing of the detected object can be detected accurately on the basis of the detected results (distance, bearing, and reception signal intensity) in the time zone A, B, C, or D and the detected results in the time zone G or H.

FIG. 7A through 7I illustrate another example of the heterodyne detection mode of the FM radar systems 40, 50 shown in FIGS. 4 and 5 when a received echo signal is modulated in the reception side of the FM radar systems 40, 50.

In the example shown in FIG. 7A through 7I, the reception signal is modulated in varying periods to change ranges in which to detect objects with a good S/N ratio and to detect the distance up to an object with high accuracy.

Figure 8:
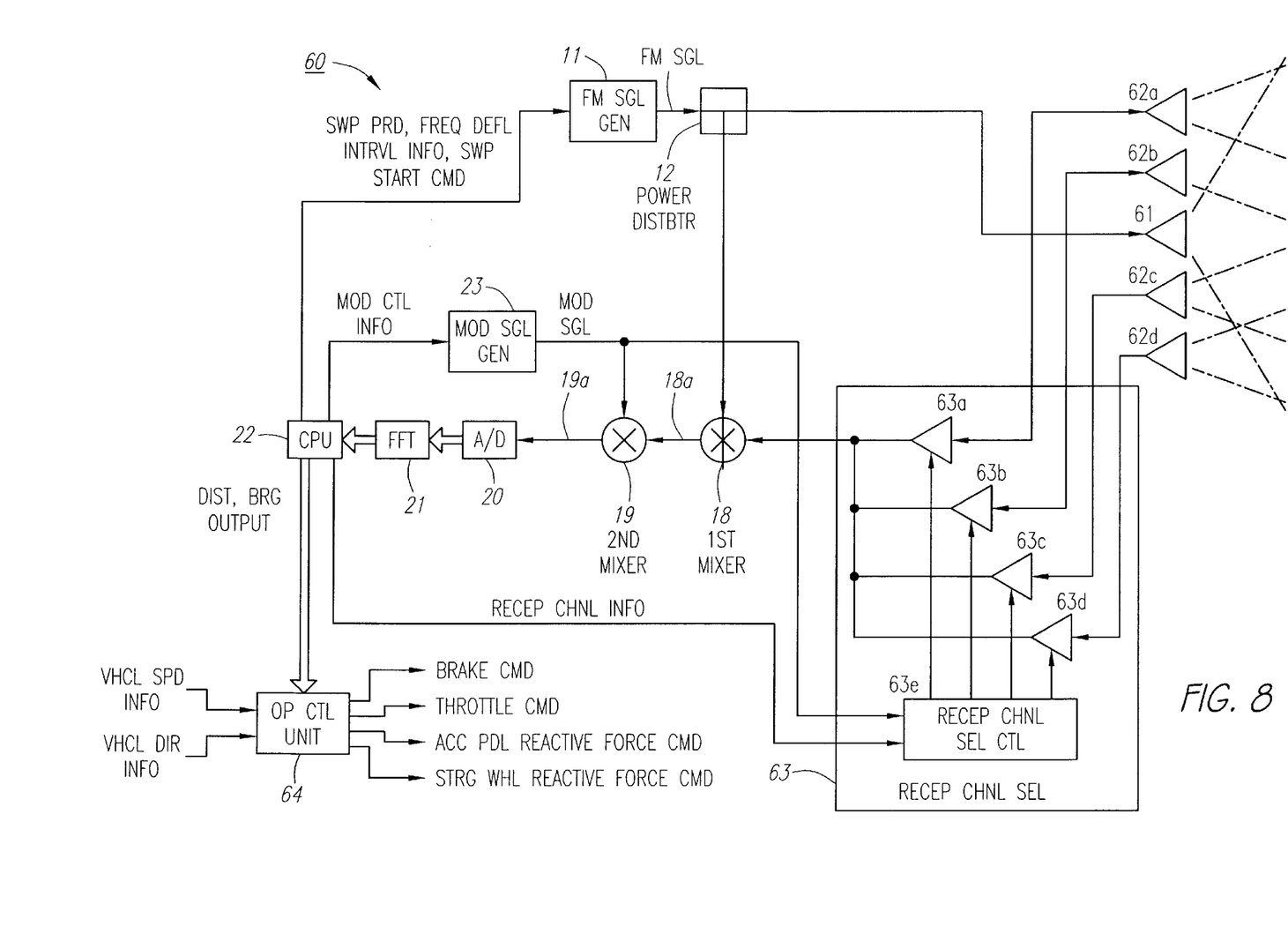
FIG. 8 is a block diagram of an FM radar system according to a fifth embodiment of the present invention.

FIG. 8 shows in block form an FM radar system 60 according to a fifth embodiment of the present invention.

As shown in FIG. 8, the FM radar system 60 has a single transmission antenna 61 for transmitting a wide beam, a plurality of reception antennas 62a–62d having respective different beam directions for receiving an echo beam reflected from an object, and a reception channel selector 63 for selecting reception channels.

The reception channel selector 63 comprises a plurality of reception amplifiers 63a–63d connected respectively to the reception antennas 62a–62d, and a reception channel selection controller 63e for selecting the reception amplifiers 63a–63d according to reception channel information and intermittently energizing the reception amplifiers 63a–63d in response to a supplied modulation signal.

The FM radar system 60 also has an operation control unit 64 for assisting in driving a motor vehicle which incorporates the FM radar system 60, based on the bearing of and the distance up to an object which are represented by an output signal generated by the CPU 22.

Other circuit details of the FM radar system 60 and operation thereof are the same as the FM radar system 40 shown in FIG. 4.

The motor vehicle equipped with the FM radar system 60 is controlled by the operation control unit 64 as follows: Vehicle speed information detected by a vehicle speed detector (not shown) and vehicle direction information detected by a steering angle detector (not shown) are supplied to the FM radar system 60. Based on these supplied items of information and also obstacle information supplied from the CPU 22, the FM radar system 60 generates a brake command and a throttle command to automatically control the driving of the motor vehicle and also generates an accelerator pedal reaction command and a steering wheel reaction command to apply reactive forces to the accelerator pedal and the steering wheel for greater driving safety.

For example, if the distance of the motor vehicle up to a preceding motor vehicle, then the operation control unit 64 generates a brake command to brake the motor vehicle. If an obstacle is detected forward and leftward of the motor vehicle, then the operation control unit 64 generates a steering wheel reaction command to apply reactive forces to the steering wheel against its counterclockwise turn, making the steering wheel heavy thereby alarming the driver. If the driver selects a cruise control mode on an expressway, for example, then the operation control unit 64 generates a throttle command in view of the distance up to a preceding motor vehicle and obstacles obliquely forward of the motor vehicle, for automatically adjusting the speed of the motor vehicle.

Figure 9:
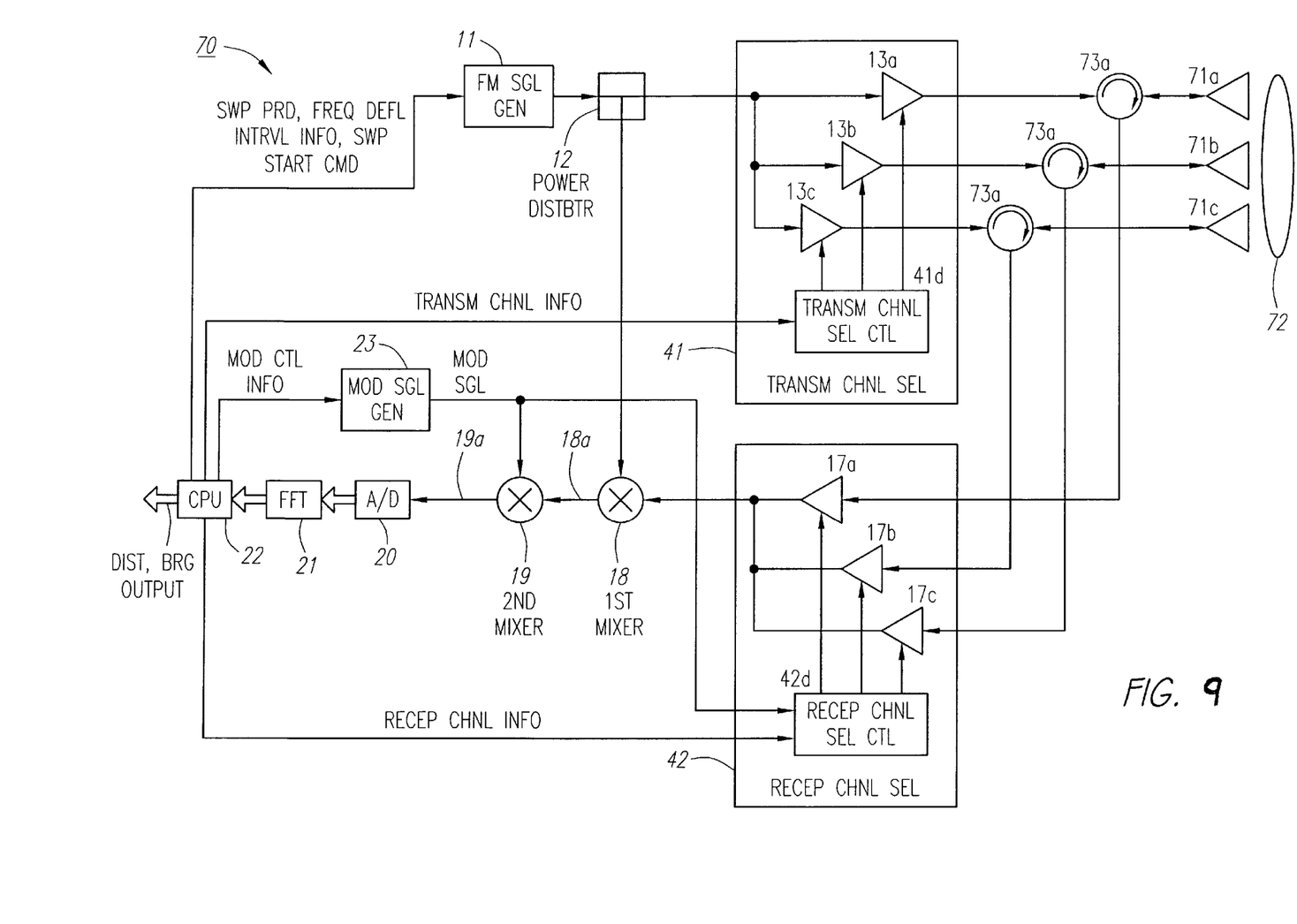
FIG. 9 is a block diagram of an FM radar system according to a sixth embodiment of the present invention.

FIG. 9 shows in block form an FM radar system 70 according to a sixth embodiment of the present invention.

As shown in FIG. 9, the FM radar system 70 is similar to the FM radar system 40 shown in FIG. 4 except that the FM radar system 70 has a plurality of transmission/reception antennas 71a–71c for radiating and receiving beams in respective channels through a transmission/reception lens (or reflector) 72 and a plurality of circulators 73a–73c connected to respectively to the transmission/reception antennas 71a–71c for supplying transmission signals from the transmission amplifiers 13a–13c respectively to the transmission/reception antennas 71a–71c and supplying reception signals from the transmission/reception antennas 71a–71c respectively to the reception amplifiers 17a–17c.

The FM radar system 70 modulates a reception signal with the modulation signal from the modulation signal generator 23. However, as shown in FIG. 1, the FM radar system 70 may modulate a transmission signal with the modulation signal from the modulation signal generator 23.

The frequency of the modulation signal may be varied depending on the detected distance up to an object to improve the S/N ratio for thereby increasing the accuracy of the detected distance.

Based on the detected distance up to an object, a transmission or reception signal may be modulated with a frequency appropriate for the detected distance to correct the detected distance for thereby increasing the accuracy of the detected distance.

In FIGS. 3A–3I, the period of the intermittent transmission in each of the time zones B, D, F, H may be varied depending on detected distances in the time zones A, C, E, G to improve the S/N ratio for thereby increasing the accuracy of the detected distances.

Similarly, in FIGS. 6A–6I, the period of the intermittent transmission in each of the time zones B, D, F, H may be varied depending on detected distances in the time zones A, C, E, G to improve the S/N ratio for thereby increasing the accuracy of the detected distances.

In each of the above embodiments, the frequency of the modulation signal generated by the modulation signal generator may be in the range from several kHz to several tens of kHz.

In the FM radar systems 30, 50 shown in FIGS. 2 and 5, the switch 31 may also be used to energize and de-energize the modulation signal generator 24 or to supply and stop the modulation signal from the modulation signal generator 24.

In each of the above embodiments, the FM radar system is highly reliable because it can operate in both the homodyne detection mode and the heterodyne detection mode.

Although certain preferred embodiments of the present invention have been shown and described in detail, it should be understood that various changes and modifications may be made therein without departing from the scope of the appended claims.

What is claimed is:

1. An FM radar system comprising:
   an FM signal generator for generating an FM signal over a sweep frequency range;
   a plurality of transmission channels for radiating the FM signal as a beam;
   a transmission channel selector for supplying the FM signal selectively to said transmission channels to select the transmission channels and modulating the FM signal;
   a reception circuit for receiving an echo beam reflected by an object and generating a reception signal based on the received echo beam; and
   a signal processor for generating a beat signal by mixing said FM signal and said reception signal and detecting the object based on said beat signal in a heterodyne detection mode.

2. An FM radar system comprising:
   an FM signal generator for generating an FM signal over a sweep frequency range;
   a transmission circuit for radiating the FM signal as a beam;
   a plurality of reception channels for receiving an echo beam reflected by an object and generating a reception signal based on the received echo beam;

a reception channel selector for selecting the reception channels and modulating the reception signal; and a signal processor for generating a beat signal by mixing said FM signal and said reception signal and detecting the object based on said beat signal in a heterodyne detection mode.

3. An FM radar system comprising:

an FM signal generator for generating an FM signal over a sweep frequency range;

a plurality of transmission channels for radiating the FM signal as a beam;

a transmission channel selector for supplying the FM signal selectively to said transmission channels to select the transmission channels and modulating the FM signal;

a reception circuit for receiving an echo beam reflected by an object and generating a reception signal based on the received echo beam;

a signal processor for generating a beat signal by mixing said FM signal and said reception signal and detecting the object based on said beat signal in a heterodyne detection mode;

a modulation signal generator for generating a modulation signal to modulate the FM signal;

said transmission channel selector comprising means for modulating the FM signal with the modulation signal generated by said modulation signal generator and leaving the FM signal unmodulated when the modulation signal generated by said modulation signal generator is of a constant voltage or no modulation signal is generated by said modulation signal generator; and said signal processor comprising means for detecting the object in a homodyne detection mode when the modulation signal generated by said modulation signal generator is of a constant voltage or no modulation signal is generated by said modulation signal generator.

4. An FM radar system comprising:

an FM signal generator for generating an FM signal over a sweep frequency range;

a transmission circuit for radiating the FM signal as a beam;

a plurality of reception channels for receiving an echo beam reflected by an object and generating a reception signal based on the received echo beam;

a reception channel selector for selecting the reception channels and modulating the reception signal;

a signal processor for generating a beat signal by mixing said FM signal and said reception signal and detecting the object based on said beat signal in a heterodyne detection mode;

a modulation signal generator for generating a modulation signal to modulate the FM signal;

said reception channel selector comprising means for modulating the reception signal with the modulation signal generated by said modulation signal generator and leaving the reception signal unmodulated when the modulation signal generated by said modulation signal generator is of a constant voltage or no modulation signal is generated by said modulation signal generator; and said signal processor comprising means for detecting the object in a homodyne detection mode when the modulation signal generated by said modulation signal generator is of a constant voltage or no modulation signal is generated by said modulation signal generator.

5. An FM radar system according to claim 3 or 4, further comprising a switch for switching between the heterodyne detection mode and the homodyne detection mode.

6. An FM radar system according to claim 3 or 4, wherein said signal processor comprises means for controlling said modulation signal generator to change a frequency of said modulation signal depending on a distance up to the detected object.

7. An FM radar system comprising:

an FM signal generator for generating an FM signal over a sweep frequency range;

a plurality of transmission channels for radiating the FM signal as a beam;

a reception circuit for receiving an echo beam reflected by an object and generating a reception signal based on the received echo beam;

a signal processor for generating a beat signal by mixing said FM signal and said reception signal and detecting the object based on said beat signal in a heterodyne detection mode; and a modulation signal generator for changing a frequency of a modulation signal in the heterodyne detection mode.

8. An FM radar system according to claim 7, wherein said modulation signal generator changes a frequency of the modulation signal depending on a distance up to the detected object.

9. An FM radar system comprising:

an FM signal generator for generating an FM signal over a sweep frequency range;

a plurality of transmission channels for radiating the FM signal as a beam;

a reception circuit for receiving an echo beam reflected by an object and generating a reception signal based on the received echo beam;

a signal processor for generating a beat signal by mixing said FM signal and said reception signal and detecting the object based on said beat signal; and a modulation signal generator for switching between a heterodyne detection mode and a homodyne detection mode.

* * * * *

UNITED STATES PATENT AND TRADEMARK OFFICE
CERTIFICATE OF CORRECTION

PATENT NO. : 6,031,483
DATED : February 29, 2000
INVENTOR(S) : Masanobu Urabe et al.

It is certified that error appears in the above-identified patent and that said Letters Patent is hereby corrected as shown below:

Column 2,
Lines 50 and 51, please change "an FM to provide" to -- to provide an FM --

Signed and Sealed this

Twenty-fifth Day of December, 2001

Attest:

JAMES E. ROGAN
*Attesting Officer*     *Director of the United States Patent and Trademark Office*